Dec. 23, 1958     A. TURIK     2,865,786
FILM COATING PROCESS AND APPARATUS
Filed Jan. 23, 1956
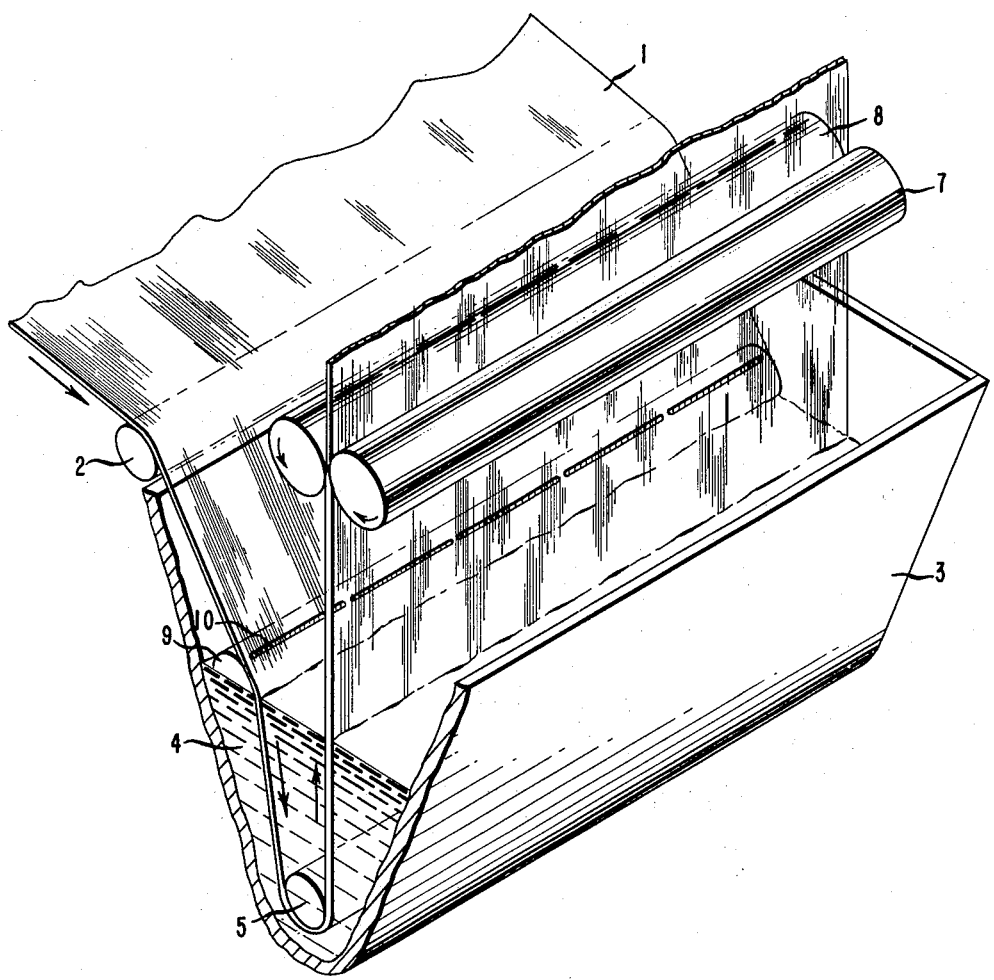
INVENTOR
*ANDREW TURIK*
BY
ATTORNEY

United States Patent Office 2,865,786
Patented Dec. 23, 1958

2,865,786
FILM COATING PROCESS AND APPARATUS

Andrew Turik, Clinton, Iowa, assignor to E. I. du Pont de Nemours and Company, Wilmington, Del., a corporation of Delaware Application January 23, 1956, Serial No. 560,785

3 Claims. (Cl. 117—67)

This invention relates to films and, more particularly, to a process and apparatus for applying clear, transparent, continuous coatings to smooth non-fibrous organic films.

The application of coatings to polymeric organic and cellulose films for the purpose of imparting special properties to films, such as heat-sealability, water and grease-proofness, controlled moisture and gas permeability, surface slip and durability is well known. The coating, however, must not detract from the appearance of the film, i. e., it must be free of visible surface defects.

Coatings may be applied to films by a variety of processes and from a variety of materials. Of the many processes in use, the immersion coating process (cf. U. S. Pat. 1,826,697) is probably the most widely used because of its simplicity, low cost and versatility. In this process, a continuous length of film is passed into a dip-tank containing a coating solution which is usually at an elevated temperature. The film then passes out of the solution and through a device, e. g., doctor rolls, which controls the amount of coating solution left on the film, and the coated film is thereafter dried to remove volatile materials such as solvents.

Although films coated by this process have achieved commercial importance and have had, in general, excellent appearance, there is often present in the coated film appearance defects, apparently originating in the coating operation and referred to as coating or lacquer smears. Film containing coating smears is not acceptable and must be sold as second quality film or discarded as waste. Many attempts have been made to eliminate coating smears by changing coating solution compositions and temperature, drying conditions and other process conditions, with little or no improvement in the frequency of the coating imperfections.

In examining the cause of coating smears produced by the conventional immersion coating process, it was observed that foam collected at the surface of the coating solution in the dip-tank between the film entering the solution and the side of the dip-tank. This area of the coating bath surface is relatively quiet compared to other areas of the surface and normally contains foam which, due to slight evaporation of liquid components, becomes viscous. Apparently, some of the foam occasionally attaches itself to the incoming film and is carried through the bath and on through the doctor rolls which squeeze the foam particles out into areas which are visible as smears.

An object of this invention, therefore, is to provide a lacquer coating process and apparatus for films which greatly reduces the formation of coating smears. Another object is to provide a process for preparing coated films which have good all-around appearance. Still another object is to provide improvements in the means for the immersion coating of film. The foregoing and other objects will more clearly appear hereinafter.

These objects are accomplished by the present invention which, briefly stated, comprises continuously applying liquid coating composition across the entire width of the underside of a moving continuous length of film at a line which is substantially parallel to the surface of the main body of liquid coating composition and above the level of foam on said surface, the maximum distance between said line and the main body of coating composition being insufficient to permit initial setting (i. e., solidification) of the coating, passing said film through the main coating composition and from thence to a device which controls the amount of coating left on the film.

A preferred means for carrying out the immersion coating process in accordance with the principles of this invention is illustrated in the accompanying drawing wherein the single view is a perspective view of a typical dip-tank with an end broken away to more clearly show the disposition of a pre-coat means relative to other elements of the dip-tank assembly.

Referring to the drawing: a moving, continuous web of film 1 is guided by roll 2 into dip-tank 3 containing a bath 4 of liquid coating composition. The film passes beneath submerged guide or dip-rod 5, and the film, containing excess coating, is then led through a set of spaced doctor rolls 7 and 8 which control the thickness of the coating on the film, and the coated film is then passed through a drier (not shown). Before the film enters the bath, the coating composition is applied on the underside and across the width of the film by means of a hollow polished tube 9 of substantially the same length as the dip-tank and to which coating composition continuously is supplied by any suitable means (not shown). The coating composition continuously emerges from tube 9 through a series of slots 10 aligned lengthwise of the tube. The slotted tube is positioned lengthwise of the dip-tank and in the path of the incoming film so that the slots are top-side and above the level of foam on the surface of bath 4, and the tube, in the path of the film, serves to deflect the film slightly from its normal straight-line course from guide-roll 2 to dip-rod 5, whereby the film is maintained in continuous contact with the tube. The slotted tube is further positioned so that the slots 10 are about 5° off vertical (towards the film) but is not rotated to the extent that the slots are covered by the moving film.

In operation, the liquid coating composition (identical in composition to that of the bath), flowing freely and continuously from slots 10, contacts the underside of the incoming film on the transverse line along which the moving film contacts tube 9. Thus, there is continuously applied to the underside of the film, just before it contacts the surface foam and enters the coating bath, a liquid coating which effectively serves to prevent the formation of coating smears. When the coating solution is pre-applied to that side of the film which comes in contact with the viscous foam, as above described, the foam apparently is prevented from attaching itself to the film and smears are therefore not produced. The use of conventional anti-foam agents in the coating bath in concentrations effective to prevent lacquer smears resulted in film having an objectionable blush.

Application of coating solution to the film prior to its entry into the dip-tank is not restricted to the use of a slotted tube. Other means by whch a continuous layer of coating solution may be applied across the entire width of a film are satisfactory. It is important, however, that regardless of the method and means of application, the solution applied must be free of foreign matter, gel particles, viscous foam, or anything that would tend to impair the appearance of the film. It is also requisite that the solution be applied to the film at a point which is above the level of foam collected at the surface of the main coating solution. However, the distance between this point of pre-application and the surface of the main coating solution should not be so great as to allow coagulation or setting of the pre-coat before the film enters the coating bath.

The process of this invention is particularly applicable in the immersion coating of regenerated cellulose film with lacquer-type moistureproofing coating compositions, i. e., compositions comprised of nitrocellulose or equivalent film-former, wax, resin, etc., dissolved in volatile organic solvent, e. g., an ethyl acetate-toluene mixture. This invention, however, is generally useful in the immersion coating of any film when employing a coating solution and/or dispersion having foaming tendencies.

As a measure of performance for this invention, a comparison was made in the number of rolls of film rejected because of smears both before and after the adoption of the invention. Several types of coating solutions were used but all were based on nitrocellulose-wax solutions in ethyl acetate-toluene mixtures. The various coating solutions differed in the type of wax and other additives such as plasticizers, resins, etc. From 34,000 rolls inspected before the invention was adopted and 18,000 rolls inspected after the invention was adopted, it was found that an improvement of 93–94% in rolls rejected for coating smears was realized by the invention.

I claim:

1. In the process of coating film wherein a continuous web of film is continuously passed through a bath of liquid coating composition having a layer of foam of said composition at the surface of the bath whereby to coat both sides of said film, the improvement which comprises continuously coating the underside of said film with said liquid coating composition for the entire width of the film at a line which is substantially parallel to the surface of said bath and above the level of foam on said surface, and thereafter passing said film through said bath, the distance between said line of prior coating and said surface of the bath being limited to prevent solidification of the coating on the film.

2. In the process of coating regenerated cellulose film with a lacquer-type moistureproofing coating composition wherein a continuous web of regenerated cellulose film is continuously passed through a bath of a solution of said coating composition having a layer of foam of said composition at the surface of the bath whereby to coat both sides of said film, the improvement which comprises continuously coating the underside of said film with said solution for the entire width of said film at a line which is substantially parallel to the surface of said bath and above the level of foam on said surface and thereafter passing said film through said bath, the distance between said line of prior coating and said surface of the bath being limited to prevent solidification of the coating on the film.

3. In combination, a bath of liquid coating composition, means for passing a continuous web of film through said bath and a cylindrical, straight tube of a length at least equal to the width of said film and having a substantially continuous slot opening parallel to the longitudinal axis of said tube and of a length at least equal to the width of said film, said tube being positioned substantially parallel to the surface of the bath with the slot opening disposed top side of the tube above the level of foam on the surface of the bath, said tube being further positioned in the path of the film before the film enters the bath to contact the underside of the film transversely of the film and adjacent said slot at a distance above said surface of the bath sufficient to prevent solidification of the coating on the film.

References Cited in the file of this patent

UNITED STATES PATENTS

| | | |
|---|---|---|
| 1,845,775 | Zavertnik et al. | Feb. 16, 1932 |
| 2,375,403 | Croce | Sept. 14, 1940 |
| 2,309,981 | Randall | Feb. 2, 1943 |
| 2,697,053 | Stamatoff | Dec. 14, 1954 |
| 2,730,455 | Swann | Jan. 10, 1956 |